(12) United States Patent
Lande Blau et al.

(10) Patent No.: US 12,554,847 B1
(45) Date of Patent: Feb. 17, 2026

(54) TECHNIQUES FOR CYBERSECURITY THREAT DETECTION UTILIZING SENSOR-BASED AGGREGATED RUNTIME EXECUTION DATA

(71) Applicant: Wiz, Inc., New York, NY (US)

(72) Inventors: Amir Lande Blau, Tel Aviv (IL); Michael Aminov, Givatayim (IL); Arik Nemtsov, New York, NY (US); Udi Reitblat, Tel Aviv (IL); Shahar Yakov, Givatayim (IL); Jonathan Doron, Herzliya (IL); Eliad Peller, Gimzo (IL); Gal De Leon, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/974,156

(22) Filed: Dec. 9, 2024

(51) Int. Cl.
  *G06F 21/55* (2013.01)
  *G06F 21/50* (2013.01)
  *G06F 21/56* (2013.01)
  *H04L 9/40* (2022.01)

(52) U.S. Cl.
  CPC .......... *G06F 21/554* (2013.01); *G06F 21/50* (2013.01); *G06F 21/566* (2013.01); *G06F 2221/034* (2013.01); *H04L 63/14* (2013.01)

(58) Field of Classification Search
  CPC ........ G06F 21/55; G06F 21/554; G06F 21/50; G06F 21/52; G06F 21/563; G06F 21/566; G06F 2221/034; H04L 63/1425; H04L 63/14; H04L 63/1441; H04L 9/002
  See application file for complete search history.

(56) References Cited

U.S. PATENT DOCUMENTS

| | | | |
|---|---|---|---|
| 8,448,156 B2 | 5/2013 | Demetriou et al. | |
| 9,813,435 B2 | 11/2017 | Muddu et al. | |
| 11,012,466 B2 | 5/2021 | Gilmore et al. | |
| 11,106,789 B2 | 8/2021 | Kraus et al. | |
| 11,799,893 B2 | 10/2023 | Johnson et al. | |
| 11,870,812 B2 | 1/2024 | Li | |
| 12,045,343 B2 | 7/2024 | Coull et al. | |
| 12,095,796 B1* | 9/2024 | Godefroid | G06F 9/542 |
| 12,095,806 B1* | 9/2024 | Nemtsov | H04L 63/1416 |
| 2008/0134209 A1* | 6/2008 | Bansal | H04L 67/566 719/317 |
| 2015/0365427 A1* | 12/2015 | Ben-Shalom | G06F 21/56 726/23 |
| 2021/0200884 A1* | 7/2021 | Anand | G06F 21/566 |

(Continued)

*Primary Examiner* — Shaqueal D Wade-Wright
(74) *Attorney, Agent, or Firm* — M&B IP Analysts, LLC

(57) ABSTRACT

A system and method for detecting cybersecurity threats in a cloud computing environment utilizing sensor based runtime execution data is presented. The method includes receiving aggregated runtime execution data from a runtime sensor deployed on a resource in a cloud computing environment, wherein the runtime sensor is configured to aggregate runtime execution data; generating an event log based on the aggregated runtime execution data, each event in the event log generated by extracting data from the aggregated runtime execution data; detecting in the event log a software application identifier; and initiating inspection of the resource in response to determining that a software application corresponding to the software application identifier was not previously detected on the resource.

17 Claims, 6 Drawing Sheets

(56) References Cited

U.S. PATENT DOCUMENTS

2023/0247040 A1\* 8/2023 Luttwak .............. H04L 63/1433
 726/22
2023/0388325 A1\* 11/2023 Gilad ...................... G06F 21/53

\* cited by examiner

US 12,554,847 B1

TECHNIQUES FOR CYBERSECURITY THREAT DETECTION UTILIZING SENSOR-BASED AGGREGATED RUNTIME EXECUTION DATA

TECHNICAL FIELD

The present disclosure relates generally to the detection of cybersecurity threats in a cloud computing environment, and specifically to detecting cybersecurity threats utilizing aggregated runtime execution data generated from a runtime sensor.

BACKGROUND

Cybersecurity threats come in many shapes and forms, such as malware, worms, crypto miners, man-in-the-middle attacks, code injection, misconfigurations, and so on. Different threats pose different risks and can often be detected in different ways. As such, there are many solutions which detect different types of cybersecurity threats, each with advantages and disadvantages. Cloud computing platforms, such as provided by Amazon® Web Services (AWS), Google® Cloud Platform (GCP), Microsoft® Azure, and the like, are high value targets for attackers, and therefore their vulnerabilities are more likely to become cybersecurity threats. It is therefore extremely useful to detect such cybersecurity threats.

For example, agent based solutions are able to detect both runtime and stored data, allowing to form a complete picture of the cybersecurity status of a machine having the agent installed thereon. However, agent based solutions require heavy use of compute resources, such as processor and memory resources. This is due to the agent being deployed on the machine which is scanned.

For endpoints in a network, this type of solution is impractical, as the use of those resources is reserved for performing the task of the endpoint machine. Furthermore, some agent solutions also require communication with a backend which provides definitions, rules, and the like, to enable the agent to scan for cybersecurity threats using up to date information. Additionally, some agent based solutions require root privileges or are deployed as a privileged software container. This is a security risk, as conveying such permissions is inherently risky. Therefore, as an endpoint detection and response (EDR) solution for a cloud computing production environment, agent based solutions fail at their objective, and indeed such solutions are rarely used on network endpoints due to the above-mentioned reasons.

Agentless solutions, on the other hand, do not require an agent installed on a machine. These solutions include static analysis, for example of a disk of a machine, to determine what cybersecurity threats are present. However, such solutions likewise fail at providing a complete picture, since static analysis solutions do not have access to runtime data. Such agentless solutions also fail to provide real time threat detection, thereby potentially leaving cybersecurity threats with a response for prolonged periods of time.

Utilizing both types of solutions is not practical, as there is overlap in the data of agent and agentless solutions, and the computational costs of deploying both solutions on a single network are great. This leads, in practice, to a choice between either type of solution, with the resignation that some threats will inevitably go undetected.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include receiving aggregated runtime execution data from a runtime sensor deployed on a resource in a cloud computing environment, where the runtime sensor is configured to aggregate runtime execution data. The method may also include generating an event log based on the aggregated runtime execution data, each event in the event log generated by extracting data from the aggregated runtime execution data. The method may furthermore include detecting in the event log a software application identifier. The method may in addition include initiating inspection of the resource in response to determining that a software application corresponding to the software application identifier was not previously detected on the resource. Other embodiments of this aspect include corresponding computer systems, apparatus, and computer programs recorded on one or more computer storage devices, each configured to perform the actions of the methods.

Implementations may include one or more of the following features. The method may include: generating an activity baseline for the resource based on a plurality of events stored in the event log; and detecting a deviation between the activity baseline and an event, where the event is associated with the software application identifier. The method may include: initiating a mitigation action on a resource if a deviation between the activity baseline and an event is detected. The method may include: a mitigation action includes any one of: revoking unauthorized access to a network and network devices, performing a software backup, removing the software application, using containment measures to prevent a potential threat from spreading, and any combination thereof. The method may include: configuring the runtime sensor to generate sensor data, where sensor data includes data being sent or received within the cloud computing environment. The method may include: configuring the runtime sensor to aggregate predetermined portions of relevant data of the sensor data into specific data groups. The method may include: configuring the runtime sensor to generate aggregated runtime execution data based on the aggregated predetermined portions of the sensor data into specific data groups. The method where detecting in the event log a software application identifier further may include: inspecting the event log for a software application identifier. The method may include: associating the detected software application identifier from the event log with a software application deployed on a resource in the cloud computing environment. Implementations of the described techniques may include hardware, a method or process, or a computer tangible medium.

In one general aspect, non-transitory computer-readable medium may include one or more instructions that, when executed by one or more processors of a device, cause the device to: receive aggregated runtime execution data from a runtime sensor deployed on a resource in a cloud computing environment, where the runtime sensor is configured to aggregate runtime execution data; generate an event log based on the aggregated runtime execution data, each event in the event log generated by extracting data from the aggregated runtime execution data; detect in the event log a software application identifier; and initiate inspection of the resource in response to determining that a software application corresponding to the software application identifier was not previously detected on the resource. Other embodiments of this aspect include corresponding computer systems, apparatus, and computer programs recorded on one or more computer storage devices, each configured to perform the actions of the methods.

In one general aspect, a system may include one or more processors configured to: receive aggregated runtime execution data from a runtime sensor deployed on a resource in a cloud computing environment, where the runtime sensor is configured to aggregate runtime execution data. The system may furthermore generate an event log based on the aggregated runtime execution data, each event in the event log generated by extracting data from the aggregated runtime execution data. The system may in addition detect in the event log a software application identifier. The system may moreover initiate inspection of the resource in response to determining that a software application corresponding to the software application identifier was not previously detected on the resource. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: generate an activity baseline for the resource based on a plurality of events stored in the event log; and detect a deviation between the activity baseline and an event, where the event is associated with the software application identifier. The system where the one or more processors are further configured to: initiate a mitigation action on a resource if a deviation between the activity baseline and an event is detected. The system where the one or more processors are further configured to: a mitigation action includes any one of: revoke unauthorized access to a network and network devices, performing a software backup, removing the software application, using containment measures to prevent a potential threat from spreading, and any combination thereof. The system where the one or more processors are further configured to: configure the runtime sensor to generate sensor data, where sensor data includes data being sent or received within the cloud computing environment. The system where the one or more processors are further configured to: configure the runtime sensor to aggregate predetermined portions of relevant data of the sensor data into specific data groups. The system where the one or more processors are further configured to: configure the runtime sensor to generate aggregated runtime execution data based on the aggregated predetermined portions of the sensor data into specific data groups. The system where the one or more processors, when detecting in the event log a software application identifier, are configured to: inspect the event log for a software application identifier. The system where the one or more processors are further configured to: associate the detected software application identifier from the event log with a software application deployed on a resource in the cloud computing environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
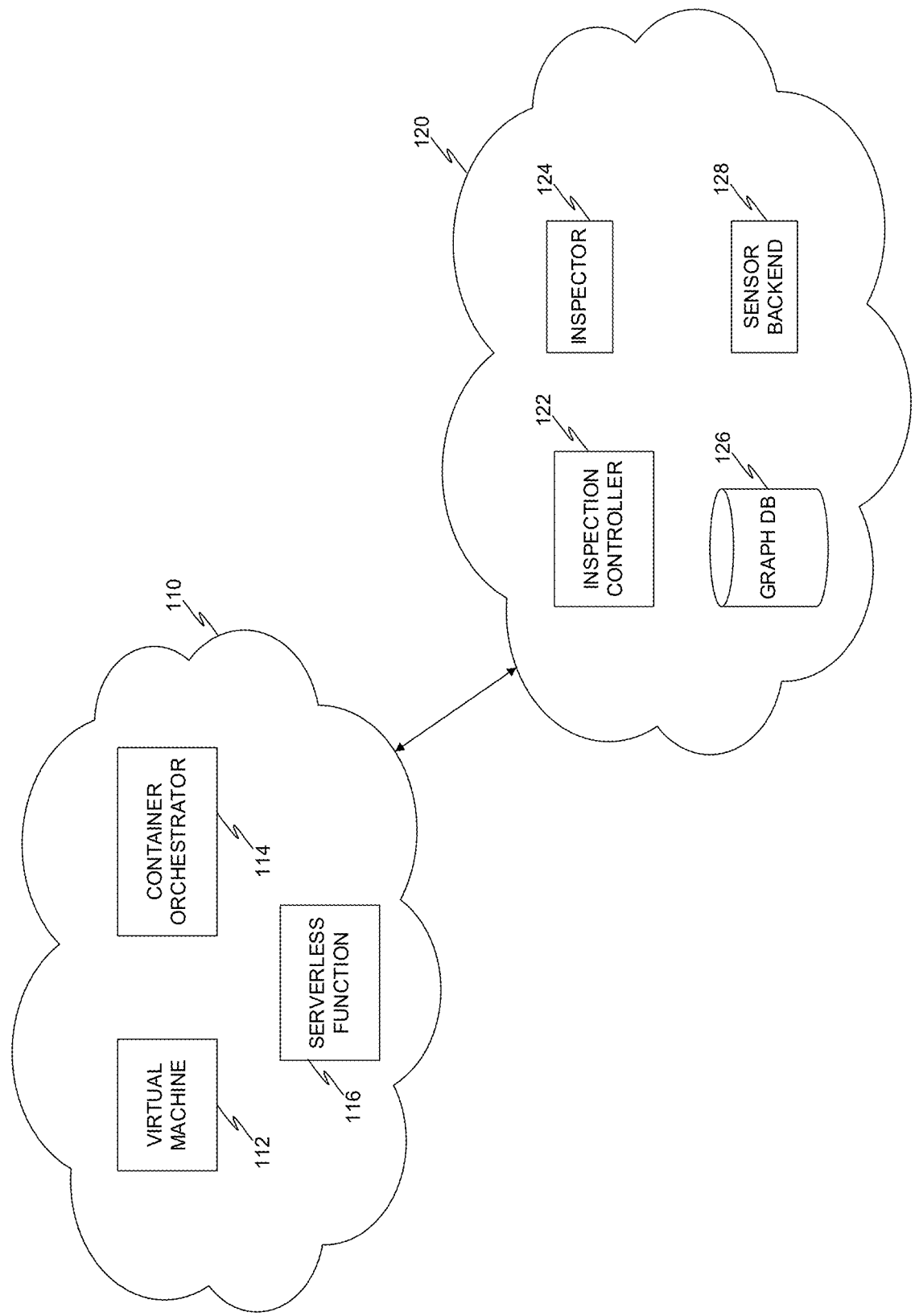
FIG. 1 is a schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for cybersecurity threat detection utilizing sensor based aggregated runtime data from a sensor deployed on a workload in a cloud computing environment. A sensor is a software package executable on a machine, such as an endpoint machine. An endpoint machine (or simply "endpoint") may be, for example, a proxy, a gateway, a reverse proxy, a webserver, and the like. A sensor is able to deploy on an endpoint utilizing less resources than an agent, as the sensor is configured to retrieve and analyze less data than an agent software is. This is due to the sensor capabilities being complemented by a static analysis solution, such as a cybersecurity threat inspector.

In an embodiment, the sensor is configured to listen to a data link layer. For example, in an embodiment, a sensor is configured to listen for packets utilizing the extended Berkeley Packet Filter (eBPF) interface. In certain embodiments, the sensor is configured to request rules, definitions, and the like, from a sensor backend server. The sensor is configured, for example, to apply a rule from the requested rules, definitions, and the like to an event detected by listening on the eBPF interface of a machine on which the sensor is deployed. In certain embodiments, the sensor is configured to send an event to the sensor backend server, for example in response to determining that the event matches a predefined definition.

In certain embodiments the sensor is configured to send an event, for example based on a predetermined definition, to a sensor backend server, which is configured to store the event on a security graph. The security graph includes a representation of the cloud computing environment in which the endpoint is deployed. For example, the sensor may detect that the endpoint sent a network packet to an IP address which is associated with a known cybersecurity risk, such as a coin mining pool. The sensor is configured to generate a notification to a sensor backend server. In an embodiment, the sensor backend server is configured to generate an instruction for an inspection controller. The inspection controller, in turn, is configured to provision an inspector to inspect the endpoint for the presence of a crypto miner malware.

By performing runtime and static analysis in this manner, the overlap in detection between the sensor and inspector are reduced. Additionally, the sensor is able to initiate inspection by the inspector, which allows efficient prioritizing of inspection resources, thereby reducing time to detection of cybersecurity threats, which also reduces time to respond to cybersecurity threats.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as a virtual machine 112, a software container orchestrator 114, and a serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

Each such resource is susceptible to various cybersecurity threats. Such threats can become apparent for example due to a software version of an application in a software container 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows non-intrusive monitoring of the data link layer communication.

In an embodiment, network traffic includes data (e.g., data packets) passing through a network or cloud computing environment at a particular point in time. In various embodiments, the runtime sensor is configured to generate sensor data which includes data being sent or received by devices, applications, or systems within the network or cloud computing environment.

Further in certain embodiments the runtime sensor is configured to track and log events in real time. In various embodiments, events include Domain Name System (DNS) queries, incoming connections, outgoing connections, executed processes, socket listening, a combination thereof, and the like.

In certain embodiments, the sensor is further configured to send data to, and receive data from, a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data, e.g., runtime execution data. For example, the sensor backend server 128 is configured, in an embodiment, to receive events from a sensor. In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition. A definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource. In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99", which in this example corresponds to an IP address range used by a malware, such as a crypto miner. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In some embodiments, the sensor is configured to generate aggregated runtime execution data. In some embodiments, the runtime sensor is configured to be deployed in operating systems, virtual machines, containers, etc., a combination thereof and the like. In certain embodiments, the runtime sensor is configured to monitor network traffic in real time. In an embodiment, the runtime sensor is configured to track processes running on a host, container, physical machine, hardware device, and the like.

In various embodiments, the runtime sensor is configured to generate sensor data. In some embodiments, sensor data includes data being sent or received by devices within the virtual machine, container, operating system, etc., a combination thereof, and the like. In various embodiments, the runtime sensor is configured to aggregate the sensor data to further generate the aggregate runtime execution data.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 is configured to generate an instruction for the inspection controller 122, which when executed by the inspection controller generates an inspectable disk, for example utilizing a snapshot, a copy, a clone, and the like of a disk (not shown) associated with the virtual machine 112 and provides access to an inspector 124 to the inspectable disk. In an embodiment, the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and crypto miners, it is readily apparent that the sensor and inspector 124 may be utilized to detect other types of cybersecurity threats, such as an exposure, a vulnerability, a weak password, an exposed password, a misconfiguration, and the like.

In certain embodiments, the inspection environment 120 further includes a graph database 126, on which a security is stored. In an embodiment, the security graph is configured to store a representation of a cloud computing environment, such as cloud computing environment 110.

For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource in the cloud computing environment may be stored in the graph database as part of the security graph.

In the example above, in response to receiving data from the sensor which indicates a potential malware infection of the virtual machine 112, the sensor backend server 128 is configured, in an embodiment, to: generate a node representing the malware in the security graph, generate a node in the security graph representing the virtual machine 112, and connect the node representing the malware with the node representing the virtual machine 112.

Figure 2:
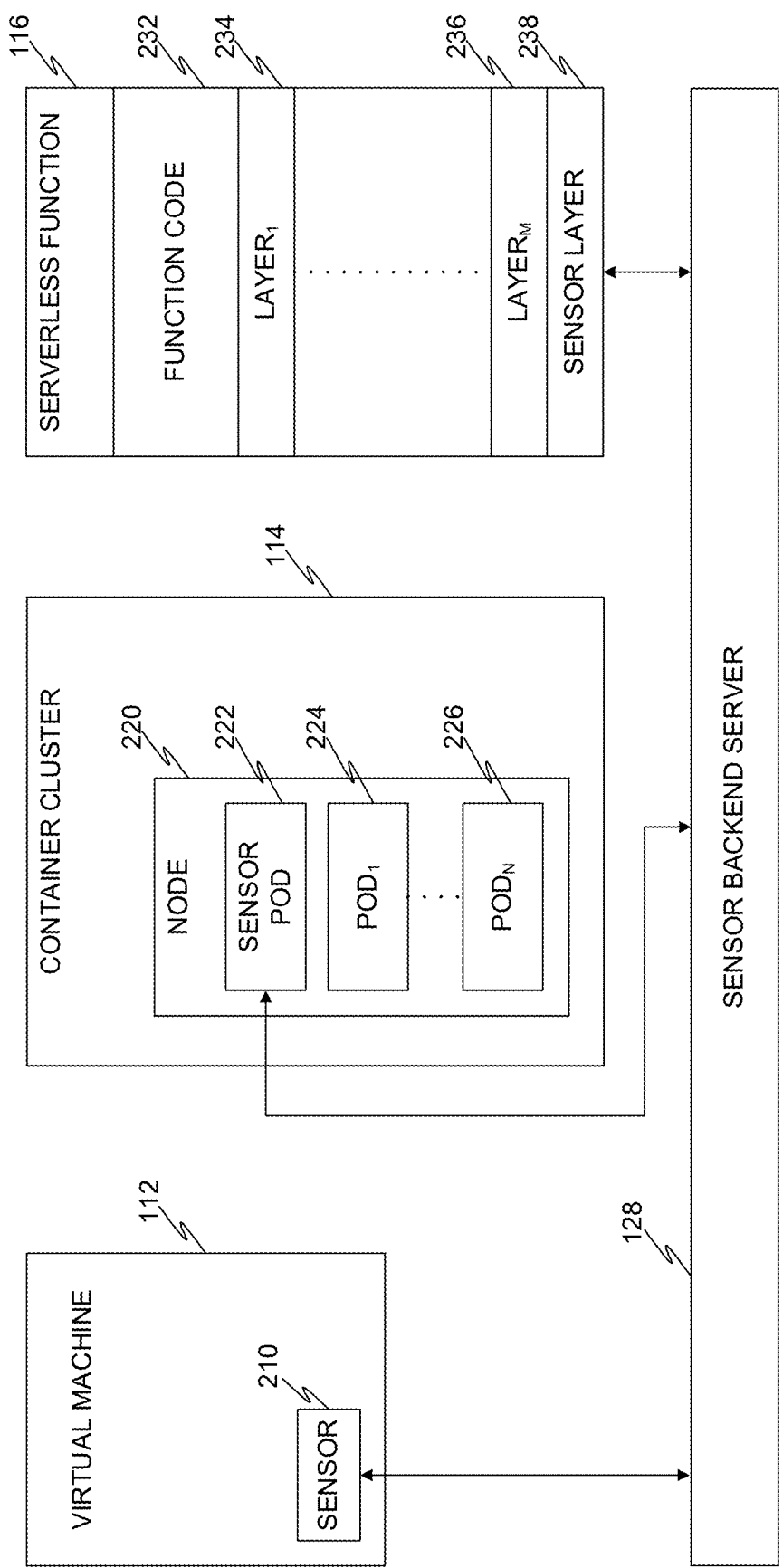
FIG. 2 is a schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is a bare metal machine, a computer device, a networked computer device, a laptop, a tablet, and the like.

In an embodiment, a sensor backend server 128 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc.

In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend sever 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the backend sensor server 128, for example by initiating communication using TCP over the predetermined port.

Figure 3:
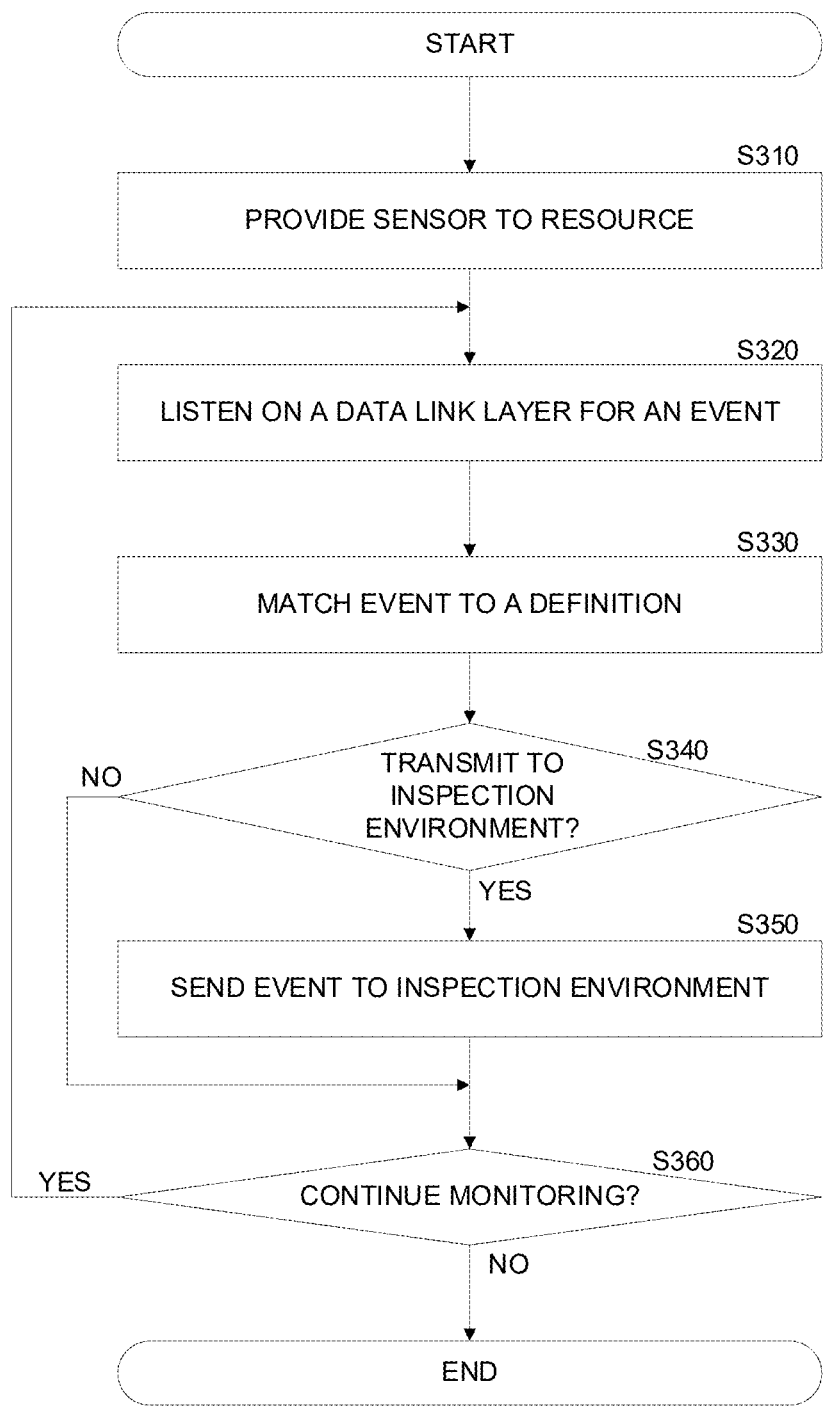
FIG. 3 is a flowchart of a method for performing cybersecurity threat detection on a resource in a cloud computing environment, implemented in accordance with an embodiment.

FIG. 3 is an example flowchart of a method for performing cybersecurity threat detection on a resource in a cloud computing environment, implemented in accordance with an embodiment.

At S310, a sensor is deployed on a resource. In an embodiment, the resource is a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment, where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, deploying a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
  exe_name: "/usr/sbin/rpc.mountd"
  last_seen: 1663138800
  exe_size: 133664
  exe_sha1:
    "200f06c12975399a4d7a32e171caabfb994f78b9"
  modules {
    path: "/usr/lib/libresolv-2.32.so"
    last_seen: 1663138800
  }
  modules {
    path: "/usr/lib/libpthread-2.32.so"
    last_seen: 1663138800
  }
  modules {
    path: "/usr/lib/ld-2.32.so"
    last_seen: 1663138800
  }
  modules {
    path: "/usr/lib/libc-2.32.so"
    last_seen: 1663138800
  }
  modules {
    path: "/usr/lib/libtirpc.so.3.0.0"
    last_seen: 1663138800
  }
  modules {
    path: "/usr/lib/libnss files-2.32.so"
    last_seen: 1663138800
  }
  modules {
    path: "/usr/sbin/rpc.mountd"
    last_seen: 1663138800
  }
  listening sockets {
    ip_addr: "0.0.0.0"
    port: 60311
  }
  listening sockets {
    ip_addr: "0.0.0.0"
    port: 43639
  }
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed", with a result being either true or false, when applied to an event.

In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like.

In some embodiments, the check is performed based on a predetermined amount of elapsed time (e.g., every four hours, every day, twice a day, etc.). If 'yes', execution continues at S320. If 'no', in an embodiment, execution terminates. In some embodiments, if 'no', another check is performed at S360, for example after a predetermined period of time has lapsed.

Figure 4:
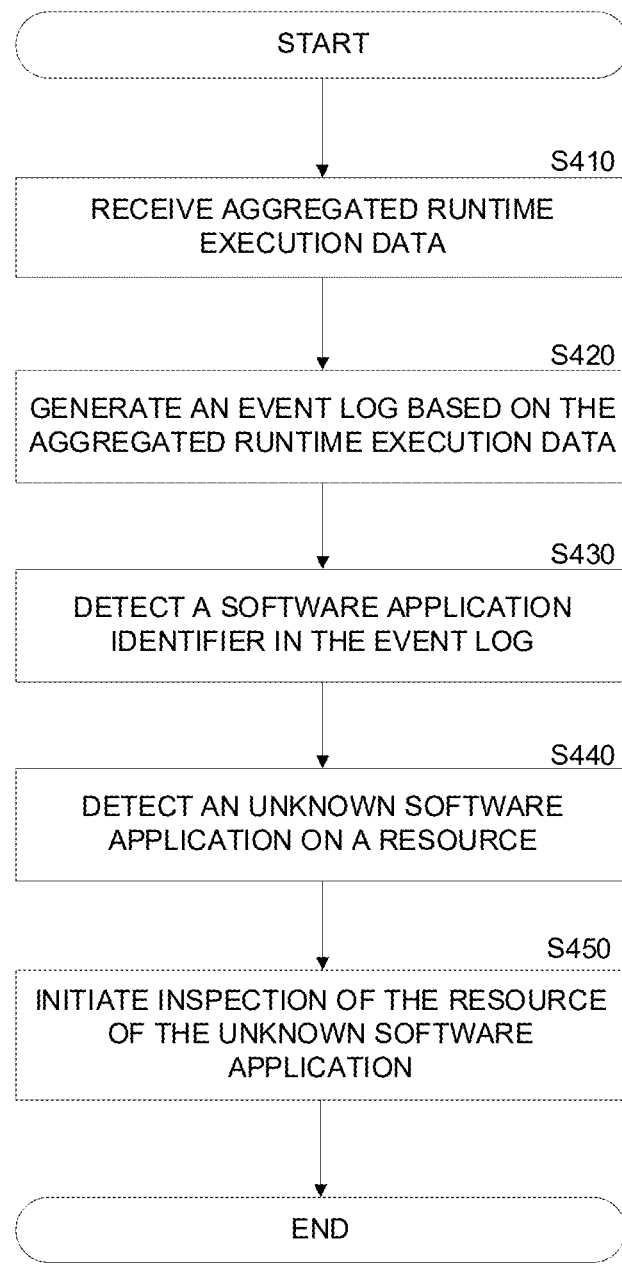
FIG. 4 is a flowchart of a method for detecting cybersecurity threats based on runtime execution data, implemented in accordance with an embodiment.

FIG. 4 is an example flowchart of a method for detecting cybersecurity threats based on runtime execution data, implemented in accordance with an embodiment.

Detecting threats and vulnerabilities in cloud workloads are challenging as agent-based solutions lack cloud context, require constant maintenance, and have limited visibility in finding vulnerabilities. Therefore, it is advantageous to utilize an agentless solution such as a runtime sensor, which provides broader visibility, provides real-time protection, and enables effective threat detection, for a workload.

At S410, aggregated runtime execution data is received. In an embodiment, aggregated runtime execution data is received from a runtime sensor. In some embodiments, the runtime sensor is configured to be deployed in operating systems, virtual machines, containers, a combination thereof, and the like. In certain embodiments, the runtime sensor is configured to monitor network traffic in real time. In some embodiments, the runtime sensor is configured to track network traffic in real time. In an embodiment, network traffic is data (e.g. data packets) passing through a network or cloud computing environment at a particular point in time.

In an embodiment, the runtime sensor is configured to track processes running on a host, container, physical machine, hardware device, and the like. In certain embodiments, the runtime sensor is configured to perform real-time tracing of system calls, monitor resource (e.g., processor, memory, storage, network bandwidth, etc.) usage, a combination thereof, and the like. In various embodiments, the runtime sensor is configured to generate sensor data. In some embodiments, sensor data includes data being sent, received, etc., by processes within the virtual machine, software container, operating system, a combination thereof, and the like. In an embodiment, sensor data includes data generated from processes running on a host, container, physical machine, hardware device, and the like. In an embodiment, sensor data includes events of an event-driven system. In some embodiments, the runtime sensor is configured to be deployed on virtual machines, software containers, containerized environments, serverless functions, a combination thereof, and the like. In certain embodiments, the runtime sensor is configured to monitor network traffic, process executions, file execution and modifications, and other system calls in real time.

In some embodiments, the runtime sensor is configured to aggregate the sensor data. In an embodiment, the runtime sensor is configured to aggregate portions of relevant data within the sensor data into a data group. For example, in an embodiment, sensor data related to programs running on a container are aggregated into a specific data group.

Further, in an example embodiment, sensor data including 100 bash command executions with different parameters are aggregated into a data group. In an embodiment, for example, sensor data related to software programs running on multiple software containers are aggregated into specific data groups based on software container identifiers.

In various embodiments, the runtime sensor is configured to generate aggregated runtime execution data based on the aggregation of predetermined portions of sensor data into specific data groups. For example, in an embodiment, a predetermined portion corresponds to a data field (e.g., ID, timestamp, etc.) which is utilized to aggregate values from multiple event records into a single event.

In an embodiment, aggregating the sensor data of the runtime sensor is beneficial as the aggregated runtime execution data allows to transfer aggregated sensor data from a virtualization on which the runtime sensor is deployed to a backend server which is configured to further process such data. Further, in an embodiment, aggregated runtime data is beneficial as it is utilized to establish a baseline of normal behaviors of software applications, programs, devices, and the like. In various embodiments, the establishment of a baseline of normal behaviors provides for the detection of a deviation of such normal behaviors, indicating a cybersecurity threat, a vulnerability, a combination thereof, and the like.

At S420, an event log is generated. In various embodiments, an event log is generated based on data extracted from the aggregated runtime execution data. In some embodiments, an event is a specific occurrence within an operating system, occurring relative to a software application deployed on a virtualization, an event related to a cloud computing environment, an event related to a software container, a combination thereof, and the like. In some embodiments, an event record is a digital record of an event.

In certain embodiments, the event is a specific occurrence within the network traffic. In an embodiment, the event is a data record indicating a change in the state of a system, network, environment, operating system a combination thereof, and the like. In various embodiments, events include a DNS query, an incoming connection, an outgoing connection, process execution details, a combination thereof, and the like. In an embodiment, an event log includes a plurality of data records, each data record storing information respective of an event. In some embodiments, the event log includes events detected by the runtime sensor.

In some embodiments, the backend server is configured to extract data from the aggregated runtime execution data. In certain embodiments, the backend server is configured to generate an event record based on data extracted from the aggregated runtime execution data, wherein a plurality of event records are utilized to generate an event log. In an embodiment, the backend server is configured to inspect the event log for events of a predetermined type, of an undetermined type, a combination thereof, and the like.

In an embodiment, the event record provides cloud context, runtime context, a combination thereof, and the like. In some embodiments, the event record includes data of a cluster, a namespace, a container, a host, an image, program name execution times, a user identifier, a script name, a combination thereof, and the like.

At S430, a software application identifier is detected. In an embodiment, a software application identifier is detected in the event log. In various embodiments, a software identifier distinguishes one software application from another. In some embodiments, a software identifier is a unique code used to identify the software application. In an embodiment, a software identifier is a unique identifier of a software application.

In some embodiments, a software identifier identifies the software application and software application data. For example, in an embodiment a software application identifier is a version number, a package name, an application identifier, a build number, a Universally Unique Identifier (UUID), and the like.

In certain embodiments, detecting a software application identifier includes inspecting the event log for a software application identifier. In various embodiments, the event log is stored in a database, which is queried for a software application identifier. Further, in various embodiments, a software application identifier is detected in response to the query of the event log returning a software application identifier.

At S440, an unknown software application is detected. In an embodiment, an unknown software application is detected on a resource. In an embodiment, a software application which was not previously detected on the resource is an unknown software application. In an embodiment, the resource is a virtual machine, a software container, a serverless function, a combination thereof, and the like. In various embodiments, detecting an unknown software application includes associating the detected software application identifier from the event log with a software application.

In an embodiment, the backend server, the inspection controller, the inspector, a combination thereof, and the like, is configured to determine if the software application was previously detected on the resource before based on querying a security database, querying an SBOM, a combination thereof, and the like.

At S450, an inspection is initiated. In an embodiment, an inspection of a resource is initiated. In some embodiments, the inspection is initiated to detect the unknown software application. In an embodiment, initiating the inspection of a resource includes inspecting the resource for a software artifact, a binary, a library, an application, a file, a folder, a cybersecurity object, a code object, a combination thereof, and the like. In an embodiment, a software artifact, a binary, a library, an application, a file, a folder, a cybersecurity object, a code object, etc., is an indication of a cybersecurity threat, vulnerability, exposure, a combination thereof, and the like.

In certain embodiments, the results of the inspection of a resource are stored in a security database, such as a graph database. Further, in an embodiment, a security graph, representing a computing environment, is stored in the graph database. In an embodiment, the security graph is generated based on results from the inspection of the resource. For example, in an embodiment, the security graph is generated based on detected cybersecurity objects from the inspection of the resource. In some embodiments, the security database includes representations of resources, principals, enrichments, cybersecurity objects, application endpoints, cybersecurity threats, remediation actions, a combination thereof, and the like.

In an embodiment, detecting a cybersecurity object indicating an unknown software application deployed on a resource initiates a remediation action. In some embodiments, a remediation action is initiated in response to the detection of a cybersecurity threat, vulnerability, exposure, a combination thereof, and the like. In some embodiments, a remediation action includes, revoking access to the network, revoking access to a network device, performing a software backup, removing the unknown software application, using containment measures to prevent a potential threat from spreading, etc., a combination thereof, and the like.

Figure 5:
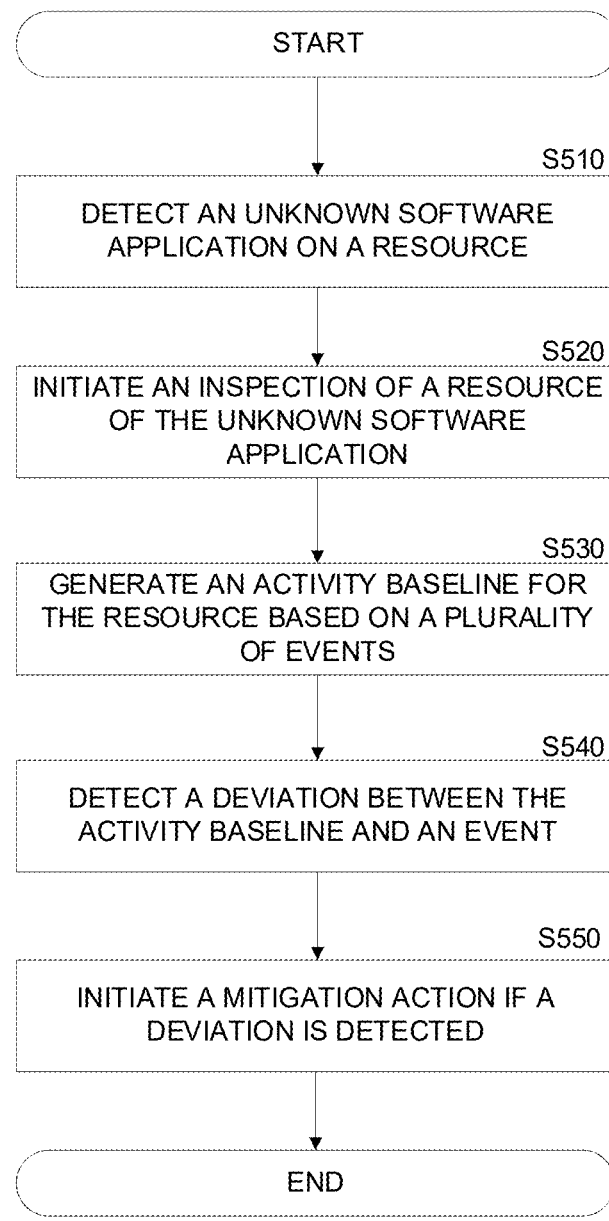
FIG. 5 is a flowchart of a method for detecting an unknown software application, implemented in accordance with an embodiment.

FIG. 5 is a flowchart of a method for detecting an unknown software application, implemented in accordance with an embodiment.

It is advantageous to detect unknown software applications on resources of cloud computing environments as they hold potential indications of cybersecurity objects, code objects, a combination thereof, and the like, in various embodiments. In an embodiment, such cybersecurity objects, code objects, and the like, are indications of cybersecurity threats, vulnerabilities, exposures, and the like.

At S510, an unknown software application is detected.

In an embodiment, an unknown software application is detected on a resource. In an embodiment, a software application which was not previously detected on the resource is an unknown software application. In an embodiment, the resource is a virtual machine, a software container, a serverless function, a combination thereof, and the like. In various embodiments, detecting an unknown software application includes associating the detected software application identifier from the event log with a software application.

In an embodiment, the backend server, the inspection controller, the inspector, a combination thereof, and the like, is configured to determine if the software application was previously detected on the resource before based on querying a security database, querying an SBOM, a combination thereof, and the like. In certain embodiments, an unknown software application is a software application which is not previously associated with a code object, from which such a software application is potentially deployed.

At S520, an inspection of a resource is initiated. In some embodiments, the inspection is initiated to detect the unknown software application. In an embodiment, initiating the inspection of a resource includes inspecting the resource for a software artifact, a binary, a library, an application, a file, a folder, a cybersecurity object, a code object, a combination thereof, and the like, which indicate presence of the unknown software application. In an embodiment, a software artifact, a binary, a library, an application, a file, a folder, a cybersecurity object, a code object, etc., is an indication of a cybersecurity threat, vulnerability, exposure, a combination thereof, and the like.

In certain embodiments, the results of the inspection of a resource are stored in a security database, such as a graph database. Further, in an embodiment, a security graph, representing a computing environment, is stored in the graph database. In an embodiment, the security graph is generated based on results from the inspection of the resource. For example, in an embodiment, the security graph is generated based on detected cybersecurity objects from the inspection of the resource. In some embodiments, the security database includes representations of resources, principals, enrichments, cybersecurity objects, application endpoints, cybersecurity threats, remediation actions, a combination thereof, and the like.

In an embodiment, detecting a cybersecurity object indicating an unknown software application deployed on a resource initiates a remediation action. In some embodiments, a remediation action is initiated in response to the detection of a cybersecurity threat, vulnerability, exposure, a combination thereof, and the like. In some embodiments, a remediation action includes, revoking access to the network, revoking access to a network device, performing a software backup, removing the unknown software application, using containment measures to prevent a potential threat from spreading, a combination thereof, and the like.

At S530, an activity baseline is generated. In certain embodiments, an activity baseline for a resource is generated based on a plurality of events. In some embodiments, an event is a specific occurrence within an operating system, occurring relative to a software application deployed on a virtualization, an event related to a cloud computing environment, an event related to a software container, a combination thereof, and the like. In certain embodiments, the event is a specific occurrence within the network traffic. In an embodiment, the event is an indication of a change in the state of a system, network, environment, operating system, a combination thereof, and the like. In various embodiments, events include a DNS query, an incoming connection, an outgoing connection, process execution details, a combination thereof, and the like.

In an embodiment, the activity baseline of the resource establishes typical behavior of a resource, including regular network traffic patterns, user login times, application usage, system performance, a combination thereof, and the like. In certain embodiments, establishing an activity baseline provides a reference point of normal resource behavior, which is advantageous, as this provides for the identification of deviations, which is an indication of potential threats, vulnerabilities, a combination thereof, and the like.

At S540, a deviation is detected. In an embodiment, a deviation between the activity baseline and an event is detected. In various embodiments, a deviation is an anomaly of behavior between the activity baseline and an event. In certain embodiments, the event is associated with a software identifier. In some embodiments, the event is associated with an unknown software application. In an embodiment, an event is a specific occurrence based on an action of an unknown software application. In various embodiments, a deviation is an indication of a potential cybersecurity threat, vulnerability, exposure, a combination thereof, and the like.

For example, in an embodiment, a deviation is detected in response to a known software application of a resource attempting to obtain access to an unauthorized file. In certain embodiments, a deviation is detected in response to an unknown software application, executing a typical command line to access a known file. In some embodiments, a deviation is detected in response to an unknown software application executing a command line to provide an unauthorized user with access to an internal file. In various embodiments, a toxic combination occurs in response to the detection of a cybersecurity object from a deviation. For example, in an embodiment, a toxic combination occurs in response to the detection of a cybersecurity object within a command line of an unknown software application.

At S550, a mitigation action is initiated. In an embodiment, a mitigation action is initiated if a deviation is detected. In some embodiments, a mitigation action is initiated on a resource in response to detecting a deviation. In an embodiment, a mitigation action includes revoking access to the network, revoking access to a network device, performing a software backup, removing the software application, using containment measures to prevent a potential threat from spreading, a combination thereof, and the like.

Figure 6:
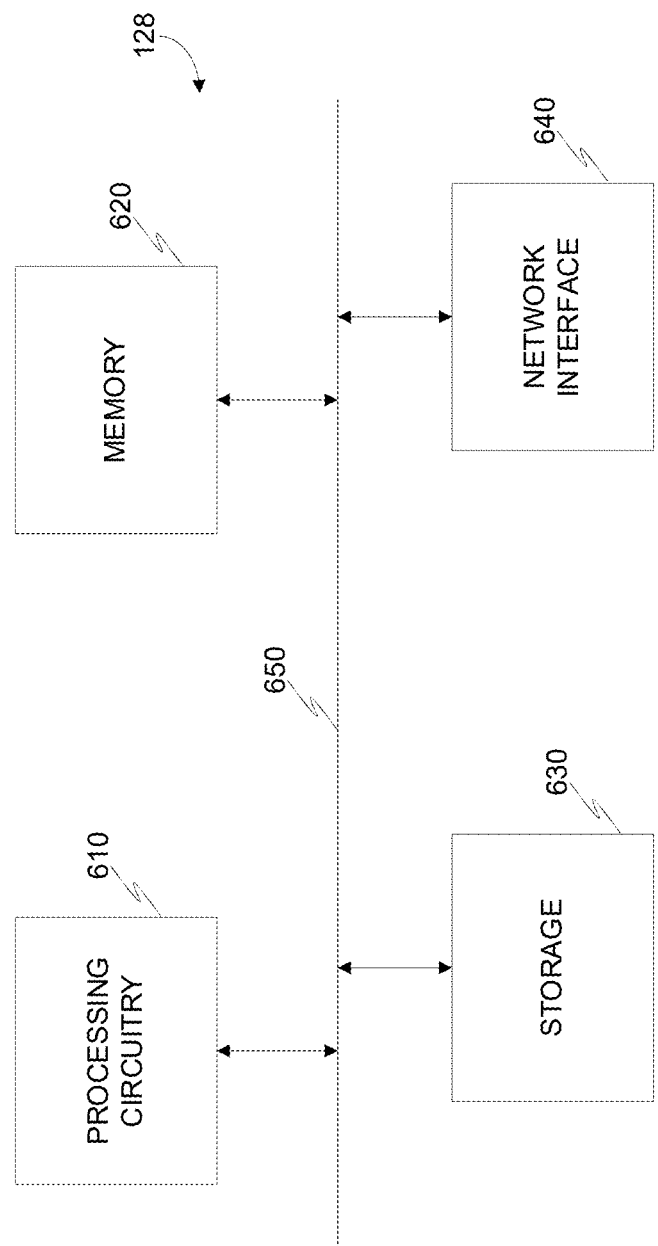
FIG. 6 is a schematic diagram of a backend sensor implemented in accordance with an embodiment.

FIG. 6 is an example schematic diagram of a sensor backend server 128 according to an embodiment. The sensor backend server 128 includes a processing circuitry 610 coupled to a memory 620, a storage 630, and a network interface 640. In an embodiment, the components of the sensor backend server 128 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the sensor backend server 128 to communicate with, for example, a sensor 210, a daemon set pod 222, a sensor layer 238, and the like.

It should be understood that the embodiments described herein are not limited to the specific architecture illustrated in FIG. 6, and other architectures may be equally used without departing from the scope of the disclosed embodiments.

Furthermore, in certain embodiments the inspection controller 122, inspector 124, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting cybersecurity threats in a cloud computing environment utilizing sensor based runtime execution data, comprising:
    receiving aggregated runtime execution data from a runtime sensor deployed on a resource in a cloud computing environment, wherein the runtime sensor is configured to aggregate runtime execution data based on predetermined portions of relevant data into specific data groups;
    generating an event log based on the aggregated runtime execution data, each event in the event log generated by extracting data from the aggregated runtime execution data;
    detecting in the event log a software application identifier of a software application;
    querying a security database based on the software application identifier;
    determining based on a result of querying that the software application was not detected on the resource; and
    initiating inspection of the resource in response to determining that the software application corresponding to the software application identifier was not previously detected on the resource.

2. The method of claim 1, further comprising:
    generating an activity baseline for the resource based on a plurality of events stored in the event log; and
    detecting a deviation between the activity baseline and an event, wherein the event is associated with the software application identifier.

3. The method of claim 2, further comprising:
    initiating a mitigation action on a resource if a deviation between the activity baseline and an event is detected.

4. The method of claim 3, further comprising:
    a mitigation action includes any one of: revoking unauthorized access to a network and network devices, performing a software backup, removing the software application, using containment measures to prevent a potential threat from spreading, and any combination thereof.

5. The method of claim 1, further comprising:
    configuring the runtime sensor to generate sensor data, wherein sensor data includes data being sent or received within the cloud computing environment.

6. The method of claim 5, further comprising:
    configuring the runtime sensor to aggregate predetermined portions of relevant data of the sensor data into specific data groups.

7. The method of claim 1, wherein detecting in the event log a software application identifier further comprises:
    inspecting the event log for a software application identifier.

8. The method of claim 7, further comprising:
    associating the detected software application identifier from the event log with a software application deployed on a resource in the cloud computing environment.

9. A non-transitory computer-readable medium storing a set of instructions for detecting cybersecurity threats in a cloud computing environment utilizing sensor based runtime execution data, the set of instructions comprising:
    one or more instructions that, when executed by one or more processors of a device, cause the device to:
        receive aggregated runtime execution data from a runtime sensor deployed on a resource in a cloud computing environment, wherein the runtime sensor is configured to aggregate runtime execution data based on predetermined portions of relevant data into specific groups;

generate an event log based on the aggregated runtime execution data, each event in the event log generated by extracting data from the aggregated runtime execution data;

detect in the event log a software application identifier of a software application;

query a security database based on the software application identifier;

determine based on a result of querying that the software application was not detected on the resource;

initiate inspection of the resource in response to determining that a software application corresponding to the software application identifier was not previously detected on the resource.

10. A system for detecting cybersecurity threats in a cloud computing environment utilizing sensor based runtime execution data comprising:

one or more processing circuitries configured to:

receive aggregated runtime execution data from a runtime sensor deployed on a resource in a cloud computing environment, wherein the runtime sensor is configured to aggregate runtime execution data based on predetermined portions of relevant data into specific data groups;

generate an event log based on the aggregated runtime execution data, each event in the event log generated by extracting data from the aggregated runtime execution data;

detect in the event log a software application identifier of a software application;

query a security database based on the software application identifier; determine based on a result of querying that the software application was not detected on the resource; and initiate inspection of the resource in response to determining that a software application corresponding to the software application identifier was not previously detected on the resource before.

11. The system of claim 10, wherein the one or more processing circuitries are further configured to:

generate an activity baseline for the resource based on a plurality of events stored in the event log; and detect a deviation between the activity baseline and an event, wherein the event is associated with the software application identifier.

12. The system of claim 11, wherein the one or more processing circuitries are further configured to:

initiate a mitigation action on a resource if a deviation between the activity baseline and an event is detected.

13. The system of claim 12, wherein the one or more processing circuitries are further configured to:

a mitigation action includes any one of:

revoke unauthorized access to a network and network devices, performing a software backup, removing the software application, using containment measures to prevent a potential threat from spreading, and any combination thereof.

14. The system of claim 10, wherein the one or more processing circuitries are further configured to:

configure the runtime sensor to generate sensor data, wherein sensor data includes data being sent or received within the cloud computing environment.

15. The system of claim 14, wherein the one or more processing circuitries are further configured to:

configure the runtime sensor to aggregate predetermined portions of relevant data of the sensor data into specific data groups.

16. The system of claim 10, wherein the one or more processing circuitries, when detecting in the event log a software application identifier, are configured to:

inspect the event log for a software application identifier.

17. The system of claim 16, wherein the one or more processing circuitries are further configured to:

associate the detected software application identifier from the event log with a software application deployed on a resource in the cloud computing environment.

* * * * *